(12) United States Patent
Guo (10) Patent No.: US 12,094,124 B2
(45) Date of Patent: Sep. 17, 2024

(54) METHOD FOR MEASURING THE BOUNDARY PERFORMANCE OF A SEMANTIC SEGMENTATION NETWORK

(71) Applicant: Robert Bosch GmbH, Stuttgart (DE)

(72) Inventor: Ze Guo, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 640 days.

(21) Appl. No.: 17/062,092

(22) Filed: Oct. 2, 2020

(65) Prior Publication Data

US 2021/0101287 A1    Apr. 8, 2021

(30) Foreign Application Priority Data

Oct. 7, 2019    (EP) .................................... 19201614

(51) Int. Cl.
*G06T 7/12* (2017.01)
*B25J 9/16* (2006.01)
(Continued)

(52) U.S. Cl.
CPC ............ *G06T 7/12* (2017.01); *B25J 9/163* (2013.01); *B25J 9/1697* (2013.01); *G06F 18/2163* (2023.01); *G06F 18/217* (2023.01); *G06F 18/2431* (2023.01); *G06N 3/08* (2013.01); *G06V 10/28* (2022.01); *G06V 10/34* (2022.01); *G06V 10/44* (2022.01); *G06V 10/776* (2022.01); *G06V 20/10* (2022.01); *G06V 20/56* (2022.01)

(58) Field of Classification Search
CPC .......... G06T 7/12; G06V 10/44; G06V 20/10; G06V 10/28; G06V 10/776; G06V 10/34; G06V 20/56; G06F 18/217; G06F 18/2163; G06F 18/2431; G06N 3/08

See application file for complete search history.

(56) References Cited

U.S. PATENT DOCUMENTS 9,390,506 B1 * 7/2016 Asvatha Narayanan .................... G06T 7/248
2019/0197696 A1 * 6/2019 Van Droogenbroeck .................... G06T 7/215

(Continued)

OTHER PUBLICATIONS

Chudasama, Diya, et al. "Image segmentation using morphological operations." International Journal of Computer Applications 117.18 (2015). (Year: 2015).*

(Continued)

*Primary Examiner* — Utpal D Shah
(74) *Attorney, Agent, or Firm* — NORTON ROSE FULBRIGHT US LLP; Gerard A. Messina (57) ABSTRACT

A method for evaluating the boundary performance of a semantic segmentation network in a convolutional neural network. A method for measuring the boundary performance of a semantic segmentation network includes the steps: determining an original boundary mask defining a boundary between different classes of an image; determining a thickened boundary mask dependent on the original boundary mask using morphological operations; determining a true positive rate, a false positive rate and a false negative rate dependent on the original boundary mask and/or the thickened boundary mask; and determining a final boundary metric, indicating the boundary performance, dependent on the determined true positive rate, the determined false positive rate and the determined false negative rate.

21 Claims, 3 Drawing Sheets

(51) Int. Cl.
*G06F 18/21* (2023.01)
*G06F 18/2431* (2023.01)
*G06N 3/08* (2023.01)
*G06V 10/28* (2022.01)
*G06V 10/34* (2022.01)
*G06V 10/44* (2022.01)
*G06V 10/776* (2022.01)
*G06V 20/10* (2022.01)
*G06V 20/56* (2022.01)

(56) References Cited

U.S. PATENT DOCUMENTS

| | | | |
|---|---|---|---|
| 2019/0251695 A1* | 8/2019 | Van Droogenbroeck | G06T 7/254 |
| 2020/0250526 A1* | 8/2020 | Kim | G06N 3/084 |
| 2020/0364875 A1* | 11/2020 | Mondal | G06T 5/70 |
| 2021/0089807 A1* | 3/2021 | Liu | G06V 10/774 |
| 2021/0117729 A1* | 4/2021 | Bharti | G01N 15/1429 |

OTHER PUBLICATIONS

"Classification: True vs. False and Positive vs. Negative" from a Machine Learning crash course by Google (Year: 2022).*
Brownlee, Jason: "Classification Accuracy is Not Enough: More Performance Measures You Can Use", in Machine Learning Mastery, Jun. 20, 2019, pp. 1-30, XP055681824.
Gibson, et al.: "Evaluation of Visual Aid Enhancement Algorithms for Real-Time Embedded Systems", in 2012 IEEE 14th International Conference on High Performance Computing and Communications, Jun. 25, 2012, pp. 1762-1769, XP032255494.
Robinson, Caleb: "Understanding intersection-over-union", Sep. 11, 2018, XP055681639; URL: http://calebrob.com/ml/2018/09/11/understanding-iou.html.
Sengar and Kapoor: "Edge detection by combination of morphological operators with different edge detection operators", International Journal of Information & Computation Technology No., 4(11) (2014), pp. 1051-1056, XP055681192.
Lookingbill, et al.: "Reverse Optical Flow for Self-Supervised Adaptive Autonomous Robot Navigation," Int'l J. of Computer Vision 74(3), (2007), pp. 287-302.

* cited by examiner

METHOD FOR MEASURING THE BOUNDARY PERFORMANCE OF A SEMANTIC SEGMENTATION NETWORK

CROSS REFERENCE

The present application claims the benefit under 35 U.S.C. § 119 of European Patent Application No. EP 19201614.5 filed on Oct. 7, 2019, which is expressly incorporated here by reference in its entirety.

FIELD

The present invention relates to a method and a device for measuring the boundary performance of a semantic segmentation network, a computer program as well as a computer readable storage medium and a control method.

BACKGROUND INFORMATION

In image recognition, semantic segmentation plays a major role. In order to recognize different objects in an image, it is necessary to detect and classify the objects of different types in the image. For example, with image recognition, computer is able to differentiate the sky from buildings from a road and/or from vegetation. This is achieved by semantic segmentation, making predictions, read the boundaries of the different objects run.

In order to measure the performance of the semantic segmentation, in particular the boundary performance of the semantic segmentation needs to be measured. In general, for this, the boundary itself has to be determined. Usually distance transform is used to get the boundary and afterwards pixels distance is used to threshold the boundary, which is highly inefficient.

Thus, there is a need for an improved method for measuring the boundary performance.

SUMMARY

The conventional approaches are inefficient in terms of computation of the boundary metric. Additionally they only consider it as an evaluation metric, which means it cannot be used for training the neural network.

Thus, in accordance with an example embodiment of the present invention, a fast and flexible way of improved measuring the boundary performance of the semantic segmentation network is provided. Additionally the boundary loss item is introduced, which is differentiable and thus can be used in the training of the semantic segmentation network in order to optimize the boundary performance.

Thus, the boundary performance can be measured in a more trustful and a more efficient way. Additionally, the boundary performance of the neural networks for semantic segmentation can be optimized directly.

According to an aspect of the present invention, a method for measuring the boundary performance of a semantic segmentation network is provided. In accordance with an example embodiment of the present invention, the method includes the steps determining an original boundary mask defining a boundary between segmented objects of an image, determining a thickened boundary mask dependent on the original boundary mask using morphological operations, determining a true positive, a false positive and a false negative dependent on the original boundary mask and the thickened boundary mask, determining a final boundary metric, indicating the boundary performance, dependent on the determined true positive rate, the determined false positive rate and the determined false negative rate.

Preferably, the method is a computer-implemented method.

The term "thickened boundary mask", as used herein, relates to an enlarged boundary mask compared to the original boundary mask. Thus, the original boundary mask defines a thinner boundary between different classes of an image.

The term "class", as used herein, related to different types of objects contained in an image, which are segmented by the semantic segmentation network of a convolutional neural network. Preferably, on an image containing objects segmented by the semantic segmentation network, an object to be detected, is segmented from a background. In a binary image map of the image, the object to be detected, also called foreground, is preferably marked by the value '1' and the background is marked by the value '0'. For example, if a dog is segmented in the image by the semantic segmentation network, every pixel of the image relating to the dog gets the value '1' and every pixel of the image relating to the background gets the value '0'. Thus, a binary image map of the image is created. Examples of different classes segmented in an image comprise landscape, cars, humans, sky, trees and/or vegetation.

The term "morphological operations", as used herein, is a broad set of image processing operations that process images based on shapes. In a morphological operation, each pixel in the image is adjusted based on the value of other pixels in its neighbourhood. By choosing the size and shape of the neighbourhood, you can construct a morphological operation that is sensitive to specific shapes in the input image. Two basic morphological operators are erosion and dilation, erosion shrinks the foreground whereas dilation enlarges the foreground object.

The original boundary mask and/or the thickened boundary mask preferably are configured as a binary boundary mask.

Preferably, determining the original boundary mask comprises thresholding the image map.

Preferably, the true positive relates to the number of pixels correctly classified as foreground. Thus, the true positive rate relates to the number of pixels correctly classified as foreground compared to the total number of pixels of the ground truth of the foreground.

Preferably, the false positive relates to the number of pixels falsely classified as foreground. Thus, the false positive rate relates to the number of pixels falsely classified as foreground compared to the total number of pixels of the ground truth of the foreground.

Preferably, the false negative relates to the number of pixels falsely classified as background. Thus, the false negative rate relates to the number of pixels falsely classified as background compared to the total number of pixels of the ground truth of the foreground.

Getting the original boundary mask and the thickened boundary mask by using morphological operations allows for an improved evaluation of the boundary performance.

Thus, the measurement of the boundary performance can be improved.

In a preferred embodiment of the present invention, determining the original boundary mask comprises determining an original ground truth boundary mask and determining a prediction original boundary and determining the thickened boundary mask comprises determining a thickened ground truth boundary mask dependent on the original ground truth boundary mask and determining a thickened prediction boundary mask dependent on the original prediction boundary mask.

To allow more pixels in the prediction to be considered as boundary pixels, the boundary of the ground truth preferably is thickened. When computing the true positive using the sum of the convolution of the thickened ground truth boundary mask and the predicted boundary the true positive rate would be higher compared to using the sum of the ground truth boundary mask and the predicted boundary mask. For the false positive rate and false negative rate similarity the score will be lower.

Thus, the measurement of the boundary performance can be improved.

In a preferred embodiment of the present invention, the method comprises the step determining a boundary loss function determined as weighted sum of a first loss term, $L_{ce}$, and a second loss term, $L_b$, wherein the first loss term represents a crossentropy loss for semantic segmentation and wherein the second loss term comprises a differentiable boundary loss term. $\alpha$ is a hyper parameter for weighting that can be tuned.

The boundary loss term is differentiable and thus can be used in the training of the semantic segmentation network in order to optimize the boundary performance.

The following function describes said relationship.

$$\text{boundary loss function} = \alpha L_{ce} + (1-\alpha) L_b$$

In a preferred embodiment of the present invention, the differentiable boundary loss term is determined dependent on the ground truth boundary mask and the prediction boundary mask.

Preferably, for one class a ground truth and a prediction is determined.

The differentiable boundary loss term is determined by $$L_b = \frac{2*(\text{ground truth} * \text{ground truth boundary mask} * \text{prediction} * \text{ground truth boundary mask})}{\text{ground truth} * \text{ground truth boundary mask} + \text{prediction} * \text{ground truth boundary mask}}$$

or $$L_b = \text{crossentropy}(\text{ground truth} * \text{ground truth boundary mask}, \text{prediction} * \text{ground truth boundary mask})$$

which determines the crossentropy of the pixels of the boundary mask.

The boundary loss term $L_b$ can be described as a loss term, which can be either calculated as cross entropy loss or dice loss that puts more weights on the boundary pixels, wherein the thickness of the boundary can be defined using the same idea from the boundary evaluation metric.

Thus, when optimizing jointly the normal pixel wise cross entropy loss and the boundary loss term, together with the tuning of the weighting parameter, the performance of the convolutional neural network on the boundary pixels can be improved.

Thus, the measurement of the boundary performance can be improved.

In a preferred embodiment of the present invention, determining the original boundary mask comprises using morphological operations.

Erosion is a morphological operation in computer vision, which shrinks the area boundary using a structuring element filter. For example, the structuring element filter is a 3×3 square.

The original boundary mask is preferably determined by subtracting an eroded binary image map from the binary image map.

The following function describes said relationship.

original boundary mask=binary image map−erosion (binary image map)

Thus, the measurement of the boundary performance can be improved.

In a preferred embodiment of the present invention, determining the original boundary mask comprises using convolution with a second order Laplacian operator.

Preferably, using convolution, comprises that the original boundary mask is determined dependent on an original boundary map. The original boundary map is determined by a two dimensional convolution of the binary image map and an edge kernel, while padding is used. The following function describes said relationship.

original boundary map=conv2d(binary image map, edge kernel, padding='SAME'

The term "padding='SAME'", as used herein, means that zero pending will be performed in order to make the output of the convolution the same shape as the input image.

Preferably, the edge kernel has the dimension 3×3. For example the edge kernel is defined as $$\text{edge\_kernel} = \begin{bmatrix} 0 & 1 & 0 \\ 1 & -4 & 1 \\ 0 & 1 & 0 \end{bmatrix} \text{ or } \begin{bmatrix} 1 & 1 & 1 \\ 1 & -8 & 1 \\ 1 & 1 & 1 \end{bmatrix}$$

The original boundary mask is the determined based on the determined original boundary map. Preferably, the original boundary mask is determined by the pixels of the boundary map with a value smaller than zero. The following function describes the relationship.

original boundary mask=original boundary map<0

Thus, the measurement of the boundary performance can be improved.

In a preferred embodiment of the present invention, determining a thickened boundary mask comprises dilation of the original boundary mask, wherein the dilation of the original boundary mask thickens an inner boundary of the original boundary mask and an outer boundary of the original boundary mask.

Since in the boundary binary map itself is thin, when calculating the boundary score directly on it, the final score will tend to be very small. In practice, there will always be certain tolerance allowed, which means, it is allowed if the predicted boundary pixel is a few pictures of. To set a threshold to the tolerance, the proposed boundary metric uses morphological operations to compute the thickened boundary mask.

Dilation is the opposite morphological operation to erosion that enlarges the area boundary using a structuring element filter. The thickness of the boundary can then be controlled by the size of the structuring element filter size. The threshold of the tolerance is then controlled by the filter size. Preferably, the filter size is 3×3.

Thus, the inner boundary of the original boundary mask is enlarged.

The following function describes said relationship.

thickened boundary mask=dilation(original boundary mask)

In a preferred embodiment, determining a thickened boundary dependent on the original boundary mask comprises erosion, wherein the erosion thickens only an inner boundary of the original boundary mask.

The following function describes said relationship.

thickened boundary mask =binary image map−erosion(binary image map, bigger kernel)

The bigger kernel preferably has a higher dimension than the edge kernel.

Thus, the inner boundary of the original boundary and an outer boundary of the original boundary is enlarged.

Thus, the measurement of the boundary performance can be improved.

In a preferred embodiment of the present invention, the true positive rate is determined dependent on the thickened ground truth boundary mask and the original prediction boundary mask, wherein the false positive rate is determined dependent on the thickened ground truth boundary mask and the original prediction boundary mask, and/or wherein the false negative rate is determined dependent on the original ground truth boundary mask and the thickened prediction boundary mask.

Preferably, the true positive is determined by the sum of the multiplication of the thickened ground truth boundary mask with the original prediction boundary mask. The true positive rate is then determined dependent on the determined true positive and the ground truth. In other words the true positive defines the total number of pixels which have value 1 (foreground) on both masks.

Preferably, the false positive is determined by the sum of the multiplication of the thickened ground truth boundary mask with the original prediction boundary mask. The false positive rate is then determined dependent on the determined false positive and the ground truth.

Preferably, the false negative is determined by the sum of the multiplication of ground truth boundary mask with the thickened prediction boundary mask. The false negative rate is then determined dependent on the determined false negative and the ground truth.

In a preferred embodiment of the present invention, the final boundary metric comprises an intersection over union score, IoU-score.

Preferably, the intersection over union score, IoU-score, is determined dependent on the true positive rate, the false positive rate and the false negative rate. Further preferably, the intersection over union score is determined by the true positive rate divided by the sum of the true positive rate, the false positive rate and the false negative rate.

The following function describes said relationship.

$$IoU\ Score = \frac{\text{true positive rate}}{\text{true positive rate} + \text{false positive rate} + \text{false negative rate}}$$

Preferably, the IoU-score is in a range between 0 and 1, wherein a higher value relates to a better score.

Thus, the measurement of the boundary performance can be improved.

In a preferred embodiment of the present invention, the final boundary metric comprises an F1-score, wherein determining the final boundary metric comprises determining a precision factor and determining a recall factor, wherein the F1-score ifs determined dependent on the determined precision and the determined recall.

Preferably, the precision factor is determined dependent on the true positive rate and the false positive rate. Further preferably, the precision factor is determined by the true positive rate divided by the sum of the true positive rate and the false positive rate.

The following function describes said relationship.

$$\text{Precision factor} = \frac{\text{true positive rate}}{\text{true positive rate} + \text{false positive rate}}$$

Preferably, the recall factor is determined dependent on the true positive rate and the false negative rate. Further preferably, the recall factor is determined by the true positive rate divided by the sum of the true positive rate and the false negative rate.

The following function describes said relationship.

$$\text{Recall factor} = \frac{\text{true positive rate}}{\text{true positive rate} + \text{false negative rate}}$$

Preferably, the F1-score is determined dependent on the precision factor and the recall factor. Further preferably, the F1-score is determined by multiplying the precision factor with the factor 2 and the recall factor and device this by the sum of the precision factor and the recall factor.

The following function describes said relationship.

$$F1 - \text{Score} = \frac{2 * \text{precision factor} * \text{recall factor}}{\text{precision factor} + \text{recall factor}}$$

Preferably, the F1-score is in a range between 0 and 1, wherein a higher value relates to a better score.

According to an aspect of the present invention, a device is configured for executing a method for measuring the boundary performance, as described herein.

According to an aspect of the present invention, a computer program is provided, comprising instructions which, when the program is executed by a computer, cause the computer to carry out the method for measuring the boundary performance, as described herein.

According to an aspect of the present invention, a computer-readable data carrier is provided, having stored thereon the computer program, as described herein.

According to an aspect of the present invention, a control method of an at least partly autonomous robot, comprises the steps receiving environmental image data of the at least partly autonomous robot, executing an image recognition on the received environmental image data, comprising executing the method for measuring the boundary performance, as described herein, controlling the at least partly autonomous robot dependent on the executed image recognition.

Preferably, the at least partly autonomous robot comprises an at least partly autonomous vehicle. Alternatively, the at least partly autonomous robot may be any other mobile robot, for example those moving by flying, swimming, diving or walking. In an example, the at least partly autonomous robot may be an at least partly autonomous lawn mower or an at least partly cleaning robot.

Preferably, controlling the at least partly autonomous robot comprises using a driver assistance function for lane keeping support and lane departure warning for the at least partly autonomous robot.

The present invention is described in more detail below with reference to preferred exemplary embodiments, which are illustrated in the figures.

BRIEF DESCRIPTION OF THE DRAWINGS

Functionally identical parts are generally provided with the same reference symbols in the figures.

DETAILED DESCRIPTION OF EXAMPLE EMBODIMENTS

Figure 1:
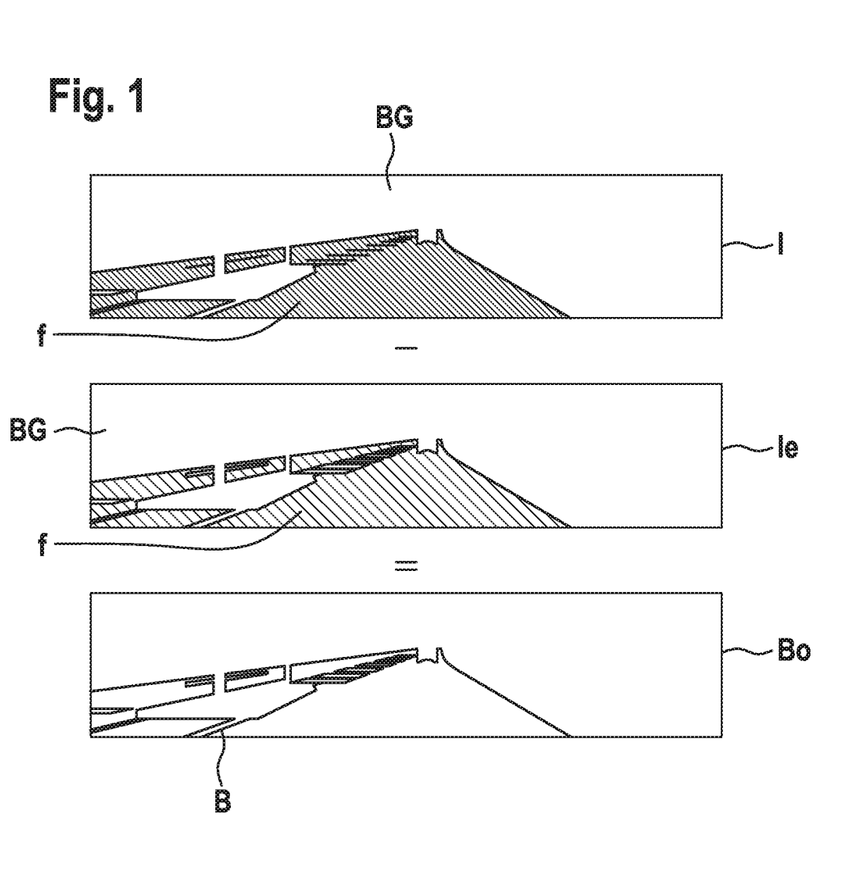
FIG. 1 shows determining the original boundary mask using erosion, in accordance with an example embodiment of the present invention.

FIG. 1 shows an image map I. The image map I is a binary image map I dividing the image map I into a foreground f and a background BG. In order to compute a binary boundary B between the foreground f and the background BG, an original boundary mask Bo is determined.

Therefore morphological operations, in this case erosion, are used. Using erosion, an area of the boundary B is shrinked using a structural element filter. In the shown case, the structuring element filter is a 3× square. Applying erosion to the image map I, determines an eroded image map Ie. Comparing the image map I with the eroded image map Ie, it can be seen that an eroded foreground fe of the eroded image map Ie is smaller than the foreground f of the image map I. Thus, an eroded background BGe of the eroded image map Ie is bigger than the background BG of the image map I.

Subtracting the eroded image map Ie from the image map I to compare them leads to the original boundary mask Bo. The erosion applied to the image map I thus determined the boundary B of the original boundary map Bo.

Figure 2:
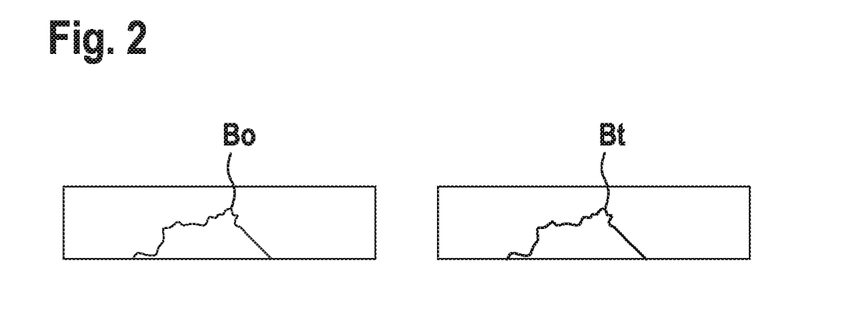
FIG. 2 shows different boundary maps, in accordance with an example embodiment of the present invention.

FIG. 2 shows the original boundary map Bo with the boundary B. As can be seen, the boundary B itself is relatively thin. Calculating a boundary score, relating to the quality of the determined boundary B, directly on the relatively thin boundary B generally leads to a small boundary score. Usually in the real world use-case, you need to tolerate some deviations on the boundaries, e.g. 10 pixels in the perimeter. Then it is very useful to have the thickened boundary calculation, since in this case you can have some tolerance thus not achieving a score that is too low and in the meanwhile still correctly reflect the performance. Thus, the boundary B needs to be thickened. A determined thickened boundary map Bt is shown in FIG. 2 comprising a thickened boundary Bth. When comparing the boundary B with the thickened boundary Bth it can be seen that the thickened boundary Bth is enlarged compared to the boundary B. This should lead to a better boundary score for the thickened boundary Bth compared to the boundary B.

Figure 3:
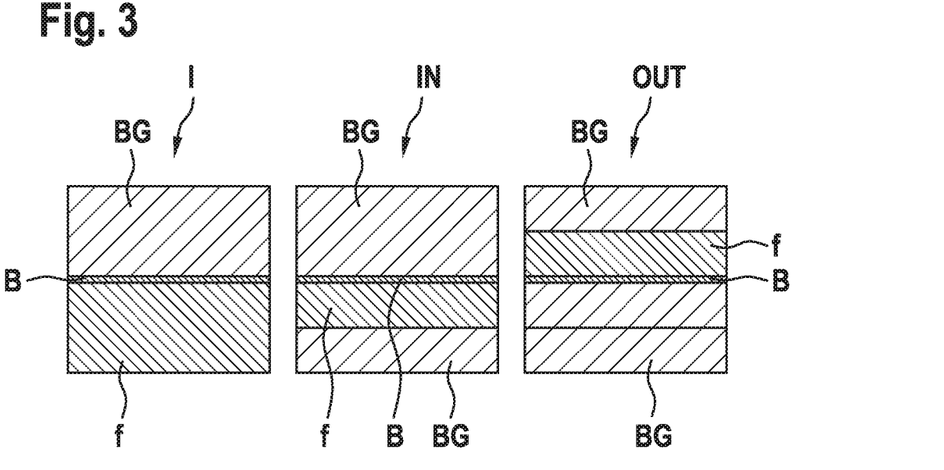
FIG. 3 shows a schematic representation of a dilation of a boundary, in accordance with an example embodiment of the present invention.

In order to determine the thickened boundary mask Bt, preferably morphological operations are used. In case of FIG. 3, dilation of the original boundary mask Bo is shown to enlarge an inner boundary IN and an outer boundary OUT of an image map I. As shown in FIG. 3 the image map I comprises a foreground f and a background BG segmented by the boundary B. Using dilation, an inner boundary IN is determined at a foreground side of the boundary B and an outer boundary OUT is determined at a background side of the boundary B. Thus, a thickened boundary Bt can be determined.

Figure 4:
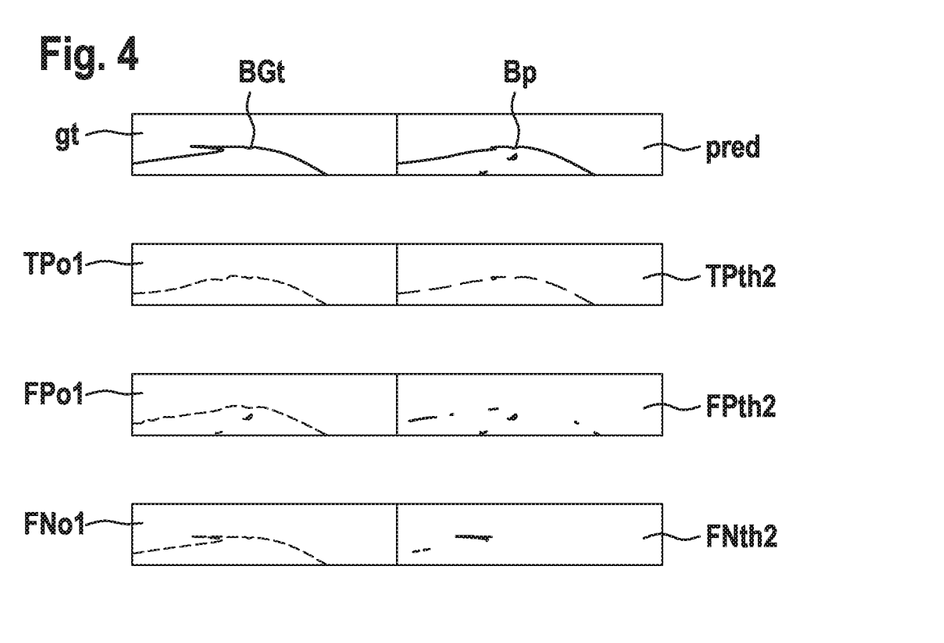
FIG. 4 shows a comparison of true positive, false positive and false negative between an original boundary and a thickened boundary based on a relatively bad prediction of the boundary, in accordance with an example embodiment of the present invention.

FIG. 4 shows a comparison of true positive, false positive and false negative between an original boundary and a thickened boundary based on a relatively bad prediction of the boundary.

First of all, a ground truth gt of the ground truth boundary Bgt is shown, which relates to the boundary between foreground and background as shown in the original image. During image recognition based on a convolutional neural network, when semantic segmentation is performed, this boundary between foreground and background needs to be predicted and a predicted boundary Bp has to be determined. In general, the predicted boundary Bp is not identical with the ground truth boundary Bgt due to different uncertainties in the semantic segmentation of the convolutional neural network.

FIG. 4 demonstrates the advantage of a thickened boundary mask compared to an original boundary mask, as described herein. As can be seen, the predicted boundary Bp differs relatively strongly from the ground truth boundary gt.

A first original true positive Tpo1 is shown, relating to the number of pixels correctly classified as the boundary of the foreground, based on an original boundary mask Bo. Compared to this, a first thickened true positive TPth1 is shown, relating to the number of pixels correctly classified as the boundary of the foreground, based on a thickened boundary mask Bt. The first thickened true positive TPth1 achieves an acceptable score while still correctly reflecting the performance of the boundary compared to the first original true positive Tpo1.

A first original false positive Fpo1 is shown, relating to the number of pixels falsely classified as the boundary of the foreground, based on an original boundary mask Bo. Compared to this, a first thickened false positive FPth1 is shown, relating to the number of pixels falsely classified as the boundary of the foreground, based on a thickened boundary mask Bt. The first thickened false positive FPth1 has a lower number of falsely classified pixels than the first original false positive Fpo1 achieves an acceptable score while still correctly reflecting the performance of the boundary compared to the first original false positive Fpo1.

A first original false negative Fno1 is shown, relating to the number of pixels falsely not classified as the boundary of the foreground, based on an original boundary mask Bo. Compared to this, a first thickened false negative FNth1 is shown, relating to the number of pixels falsely not classified as the boundary of the foreground, based on a thickened boundary mask Bt. The first thickened false negative FNth1 achieves an acceptable score while still correctly reflecting the performance of the boundary compared to the first original false negative Fno1.

The prediction boundary mask Bp, as described, does not look precise compared to the ground truth boundary mask Bgt. However, the prediction still has a very high IoU-score of 0.97 in this case. The proposed boundary score is at a reasonable value of 0.74. For example, a relatively bad boundary without thickening would achieve a IoU-score in the range of about 0.3.

Figure 5:
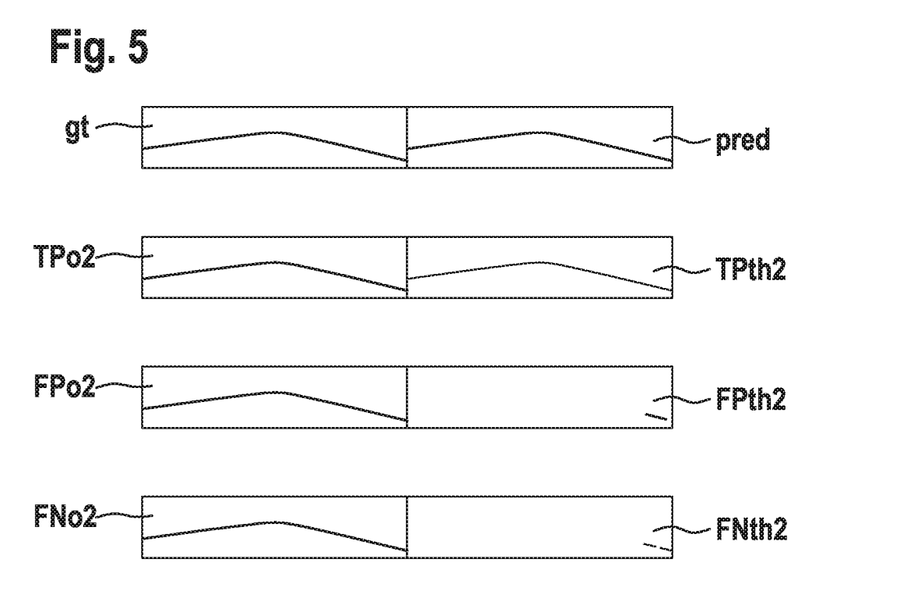
FIG. 5 shows a comparison of true positive, false positive and false negative between an original boundary and a thickened boundary based on a relatively good prediction of the boundary, in accordance with an example embodiment of the present invention.

FIG. 5 demonstrates the advantage of a thickened boundary mask compared to an original boundary mask, as described herein. As can be seen, the prediction boundary Bp differs only slightly (in comparison to FIG. 4) from the ground truth boundary gt.

A second original true positive Tpo2 is shown, relating to the number of pixels correctly classified as the boundary of the foreground, based on an original boundary mask Bo. Compared to this, a second thickened true positive TPth2 is shown, relating to the number of pixels correctly classified as the boundary of the foreground, based on a thickened boundary mask Bt. The second thickened true positive TPth2 has a large number of correctly classified pixels than the first original true positive Tpo2 and thus is more accurate than the first original true positive Tpo2.

A second original false positive Fpo2 is shown, relating to the number of pixels falsely classified as the boundary of the foreground, based on an original boundary mask Bo. Compared to this, a second thickened false positive FPth2 is shown, relating to the number of pixels falsely classified as the boundary of the foreground, based on a thickened boundary mask Bt. The second thickened false positive FPth2 has a lower number of falsely classified pixels than the second original false positive Fpo2 and thus is more accurate than the second original false positive Fpo2. The second thickened false positive FPth2 comprises a relatively small amount of falsely classified pixels.

A second original false negative Fno2 is shown, relating to the number of pixels falsely not classified as the boundary of the foreground, based on an original boundary mask Bo. Compared to this, a second thickened false negative FNth2 is shown, relating to the number of pixels falsely not classified as the boundary of the foreground, based on a thickened boundary mask Bt. The second thickened false negative FNth2 has a lower number of falsely not classified pixels than the second original false negative Fno2 and thus is more accurate than the second original false negative Fno2. The second thickened false negative FNth2 comprises a relatively small amount of falsely classified pixels.

The predicted boundary mask Bp, as described, looks precise compared to the ground truth boundary mask Bgt. The prediction has a very high IoU-score of 0.99 in this case. The proposed boundary score is at a high value of 0.95. For example, a relatively good boundary without thickening would achieve a IoU-score in the range of about 0.5.

Figure 6:
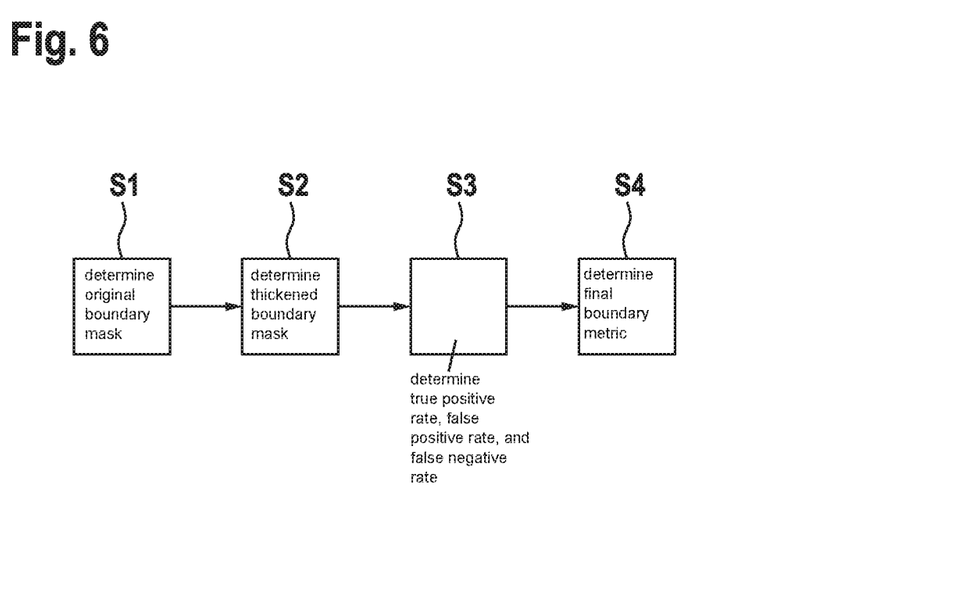
FIG. 6 shows a schematic representation of the method for measuring the boundary performance of a semantic segmentation network, in accordance with an example embodiment of the present invention.

FIG. 6 shows a schematic representation of the method for measuring the boundary performance of a semantic segmentation network. In step S1 an original boundary mask Bo is determined defining a boundary between different classes of an image. In step S2 a thickened boundary mask Bt is determined dependent on the original boundary mask Bo using morphological operations. In step S3 a true positive rate, a false positive rate and a false negative rate is determined dependent on the original boundary mask Bo and/or the thickened boundary mask Bt. In step S4 a final boundary metric is determined dependent on the determined true positive rate, the determined false positive rate and the determined false negative rate.

What is claimed is:

1. A method for measuring a boundary performance of a semantic segmentation network, the method comprising:
   determining an original boundary mask defining a boundary between different classes of an image, wherein determining the original boundary mask includes thresholding an image map having a foreground and a background;
   determining a thickened boundary mask dependent on the original boundary mask using morphological operations;
   determining a true positive rate, a false positive rate and a false negative rate, dependent on the original boundary mask and/or the thickened boundary mask;
   determining a final boundary metric, indicating the boundary performance, dependent on the determined true positive rate, the determined false positive rate, and the determined false negative rate; and
   determining a boundary loss function as a weighted sum of a first loss term and a second loss term, wherein the first loss term represents a crossentropy loss for semantic segmentation, and wherein the second loss term includes a differentiable boundary loss term;
   wherein the differentiable boundary loss term=$\alpha L_{ce}+(1-\alpha)L_b$, and wherein $\alpha$ is a hyper parameter weighting factor, wherein $L_{ce}$ is the first loss term representing a crossentropy loss for semantic segmentation, and wherein $L_b$ is the second loss term that is the differentiable boundary loss term,
   wherein the morphological operations include erosion, which shrinks an area boundary, and dilation, which enlarges the area boundary, wherein the erosion and the dilation are performed using structuring element filters, and
   wherein the true positive rate relates to a number of pixels correctly classified as foreground, wherein the false positive rate relates to a number of pixels falsely classified as foreground, and wherein the false negative rate relates to a number of pixels falsely classified as background.

2. The method of claim 1, wherein the determining of the original boundary mask includes determining an original ground truth boundary mask and determining an original prediction boundary mask, and wherein the determining of the thickened boundary mask includes determining a thickened ground truth boundary mask dependent on the original ground truth boundary mask, and determining a thickened prediction boundary mask dependent on the original prediction boundary mask.

3. The method of claim 1, wherein the differentiable boundary loss term is determined dependent on the ground truth boundary mask and the prediction boundary mask.

4. The method of claim 1, wherein the determining of the original boundary mask includes using the morphological operations.

5. The method of claim 1, wherein the determining of the original boundary mask includes using convolution with a second order Laplacian operator.

6. The method of claim 1, wherein the determining of the thickened boundary mask includes dilation of the original boundary mask, and wherein the dilation of the original boundary mask thickens an inner boundary of the original boundary mask and an outer boundary of the original boundary mask.

7. The method of claim 1, wherein the determining of the thickened boundary mask includes erosion of the original boundary mask, and wherein the erosion thickens only an inner boundary of the original boundary mask.

8. The method of claim 2, wherein: (i) the true positive rate is determined dependent on the thickened ground truth boundary mask and the original prediction boundary mask, and the false positive rate is determined dependent on the thickened ground truth boundary mask and the original prediction boundary mask, and/or (ii) the false negative rate is determined dependent on the original ground truth boundary mask and the thickened prediction boundary mask.

9. The method of claim 1, wherein the final boundary metric includes an intersection over union score.

10. The method of claim 1, wherein the final boundary metric includes an F1-score, wherein determining the final boundary metric includes determining a precision factor and determining a recall factor, and wherein the F1-score is determined dependent on the determined precision and the determined recall.

11. An apparatus for measuring a boundary performance of a semantic segmentation network, comprising:
a device configured to perform the following:
determining an original boundary mask defining a boundary between different classes of an image, wherein determining the original boundary mask includes thresholding an image map having a foreground and a background;
determining a thickened boundary mask dependent on the original boundary mask using morphological operations;
determining a true positive rate, a false positive rate and a false negative rate, dependent on the original boundary mask and/or the thickened boundary mask; and
determining a final boundary metric, indicating the boundary performance, dependent on the determined true positive rate, the determined false positive rate, and the determined false negative rate; and
determining a boundary loss function as a weighted sum of a first loss term and a second loss term, wherein the first loss term represents a crossentropy loss for semantic segmentation, and wherein the second loss term includes a differentiable boundary loss term;
wherein the differentiable boundary loss term=$\alpha L_{ce}$+(1−$\alpha$)$L_b$, and wherein $\alpha$ is a hyper parameter weighting factor, wherein $L_{ce}$ is the first loss term representing a crossentropy loss for semantic segmentation, and wherein $L_b$ is the second loss term that is the differentiable boundary loss term,
wherein the morphological operations include erosion, which shrinks an area boundary, and dilation, which enlarges the area boundary, wherein the erosion and the dilation are performed using structuring element filters, and
wherein the true positive rate relates to a number of pixels correctly classified as foreground, wherein the false positive rate relates to a number of pixels falsely classified as foreground, and wherein the false negative rate relates to a number of pixels falsely classified as background.

12. A non-transitory computer-readable data carrier, on which is stored a computer program, which is executable by a processor, comprising:
a program code arrangement having program code for measuring a boundary performance of a semantic segmentation network, the computer program, when executed by a computer, by performing the following:
determining an original boundary mask defining a boundary between different classes of an image, wherein determining the original boundary mask includes thresholding an image map having a foreground and a background;
determining a thickened boundary mask dependent on the original boundary mask using morphological operations;
determining a true positive rate, a false positive rate and a false negative rate, dependent on the original boundary mask and/or the thickened boundary mask; and
determining a final boundary metric, indicating the boundary performance, dependent on the determined true positive rate, the determined false positive rate, and the determined false negative rate; and
determining a boundary loss function as a weighted sum of a first loss term and a second loss term, wherein the first loss term represents a crossentropy loss for semantic segmentation, and wherein the second loss term includes a differentiable boundary loss term;
wherein the differentiable boundary loss term=$\alpha L_{ce}$+ (1−$\alpha$)$L_b$, and wherein $\alpha$ is a hyper parameter weighting factor, wherein $L_{ce}$ is the first loss term representing a crossentropy loss for semantic segmentation, and wherein $L_b$ is the second loss term that is the differentiable boundary loss term,
wherein the morphological operations include erosion, which shrinks an area boundary, and dilation, which enlarges the area boundary, wherein the erosion and the dilation are performed using structuring element filters, and
wherein the true positive rate relates to a number of pixels correctly classified as foreground, wherein the false positive rate relates to a number of pixels falsely classified as foreground, and wherein the false negative rate relates to a number of pixels falsely classified as background.

13. A control method for controlling an at least partly autonomous robot, the method comprising:
receiving environmental image data of the at least partly autonomous robot;
executing an image recognition on the received environmental image data, including measuring a boundary performance of a semantic segmentation network, the measuring including:
determining an original boundary mask defining a boundary between different classes of an image represented by the image data, wherein determining the original boundary mask includes thresholding an image map having a foreground and a background,
determining a thickened boundary mask dependent on the original boundary mask using morphological operations,
determining a true positive rate, a false positive rate and a false negative rate, dependent on the original boundary mask and/or the thickened boundary mask, and
determining a final boundary metric, indicating the boundary performance, dependent on the determined true positive rate, the determined false positive rate, and the determined false negative rate, wherein the morphological operations include erosion, which shrinks an area boundary, and dilation, which enlarges the area boundary, wherein the erosion and the dilation are performed using structuring element filters;

determining a boundary loss function as a weighted sum of a first loss term and a second loss term, wherein the first loss term represents a crossentropy loss for semantic segmentation, and wherein the second loss term includes a differentiable boundary loss term; and controlling the at least partly autonomous robot dependent on the executed image recognition;

wherein the differentiable boundary loss term=$\alpha L_{ce}$+(1-$\alpha$)$L_b$, and wherein $\alpha$ is a hyper parameter weighting factor, wherein $L_{ce}$ is the first loss term representing a crossentropy loss for semantic segmentation, and wherein $L_b$ is the second loss term that is the differentiable boundary loss term, and wherein the true positive rate relates to a number of pixels correctly classified as foreground, wherein the false positive rate relates to a number of pixels falsely classified as foreground, and wherein the false negative rate relates to a number of pixels falsely classified as background.

14. The method of claim 13, wherein the differentiable boundary loss term $L_b$ is as follows:

$L_b$=2*(ground truth*ground truth boundary mask*prediction*ground truth boundary mask/ground truth*ground truth boundary mask+prediction*ground truth boundary mask.

15. The method of claim 13, wherein the differentiable boundary loss term $L_b$ is determined as follows:

$L_b$=crossentropy(ground truth*ground truth boundary mask*prediction*ground truth boundary mask), which determines the crossentropy of the pixels of the boundary mask.

16. The method of claim 1, wherein the differentiable boundary loss term $L_b$ is as follows:

$L_b$=2*(ground truth*ground truth boundary mask*prediction*ground truth boundary mask/ground truth*ground truth boundary mask+prediction*ground truth boundary mask.

17. The method of claim 1, wherein the differentiable boundary loss term $L_b$ is determined as follows:

$L_b$=crossentropy (ground truth*ground truth boundary mask*prediction*ground truth boundary mask), which determines the crossentropy of the pixels of the boundary mask.

18. The apparatus of claim 11, wherein the differentiable boundary loss term $L_b$ is as follows:

$L_b$=2*(ground truth*ground truth boundary mask*prediction ground truth boundary mask/ground truth*ground truth boundary mask+prediction*ground truth boundary mask.

19. The apparatus of claim 11, wherein the differentiable boundary loss term $L_b$ is determined as follows:

$L_b$=crossentropy(ground truth*ground truth boundary mask*prediction*ground truth boundary mask), which determines the crossentropy of the pixels of the boundary mask.

20. The computer-readable data carrier of claim 12, wherein the differentiable boundary loss term $L_b$ is as follows:

$L_b$=2*(ground truth*ground truth boundary mask*prediction*ground truth boundary mask/ground truth*ground truth boundary mask+prediction*ground truth boundary mask.

21. The computer-readable data carrier of claim 12, wherein the differentiable boundary loss term $L_b$ is determined as follows:

$L_b$=crossentropy(ground truth*ground truth boundary mask*prediction*ground truth boundary mask), which determines the crossentropy of the pixels of the boundary mask.

* * * * *